United States Patent [19]
Knudsen

[11] 3,902,581
[45] Sept. 2, 1975

[54] ELECTROMAGNETIC CLUTCH

[75] Inventor: Hans G. Knudsen, Cleveland, Ohio

[73] Assignee: Automatic Research and Development Co., Willoughby, Ohio

[22] Filed: Aug. 30, 1973

[21] Appl. No.: 393,070

[52] U.S. Cl. .............................. 192/84 A; 188/161
[51] Int. Cl.² ......................................... F16D 27/06
[58] Field of Search .......... 192/84 A; 188/161, 163, 188/164

[56] References Cited
UNITED STATES PATENTS

| | | | |
|---|---|---|---|
| 1,933,208 | 10/1933 | Cotal | 192/84 A X |
| 2,560,868 | 7/1951 | Hubert | 192/84 A |
| 2,698,679 | 1/1955 | Vernhes | 192/84 A |
| 3,455,419 | 7/1969 | Miquel | 188/164 |
| 3,504,773 | 4/1970 | Miller | 192/84 A X |

FOREIGN PATENTS OR APPLICATIONS

| | | | |
|---|---|---|---|
| 857,531 | 4/1940 | France | 192/84 A |
| 690,200 | 4/1953 | United Kingdom | 188/161 |

*Primary Examiner*—Allan D. Hermann

[57] ABSTRACT

In an electromagnetic clutch or brake, the electromagnet comprises a core of annular configuration providing a pair of opposite annular end faces, an energizing winding on the core, and a pair of armature members, each armature member being of annular configuration providing an annular face confronting a respective one of the end faces of the core, the armature members being axially displaceable in relation to the core to effect engagement of the brake or clutch.

5 Claims, 10 Drawing Figures

3,902,581

3,902,581

ELECTROMAGNETIC CLUTCH

FIELD OF THE INVENTION

This invention relates to electromagnetic clutches and brakes, and is applicable, for example, to friction clutches and brakes of the multiple-disk and single-disk types.

BACKGROUND OF THE INVENTION

In present day designs of electromagnetic clutches and brakes, the maximum torque which can be transmitted is limited, for a given size of clutch or brake, by the magnetic flux which can be generated without running into saturation of the core of the electromagnet. In practice, the limiting magnetic flux density is usually about 12,000 to 14,000 gauss, resulting in a maximum locking pressure between friction surfaces of about 8 Kg. per square centimetre. Although in a multiple disk clutch or brake the torque capacity may be increased according to the number of friction disks, there is a limit to the number of disks which can be used advantageously, owing to the fact that the disks will tend to short out the flux in the magnetic circuit; in practice it is found that the number of disk surfaces which are effective is from six to eight. Moreover, by increasing the number of disks one increases the tendency for the disk faces to stick together, thus increasing the drag and so reducing the operating efficiency of the clutch or brake.

In view of these considerations, the most efficient design for a friction clutch or brake should provide a minimum number of disk faces. However, such a design necessarily sacrifices the torque capacity which would be obtainable with a larger number of disks.

SUMMARY OF THE INVENTION

According to the present invention, there is provided an electromagnetic clutch or brake having a substantially higher torque transmitting capacity than would be possible with other units of a similar size. Such a clutch or brake is characterized in that the electromagnet has a core of annular configuration providing a pair of opposite annular end faces, an energizing winding on the core, and a pair of armature members, each armature member being of annular configuration providing an annular face confronting a respective one of the end faces of the core, the armature members being axially displaceable in relation to the core to effect engagement of respective, parallel-acting, clutch or brake elements.

The energizing winding may be constituted by a coil of annular configuration mounted coaxially on the core of the electromagnet, as in conventional designs, or may consist of a number of interconnected coils mounted on radially extending pole pieces of the core, the pole pieces and coils being symmetrically arranged with respect to the axis of the clutch or brake so that stray magnetic field components on the axis are cancelled out.

BRIEF DESCRIPTION OF THE DRAWINGS

Embodiments of the invention will now be described by way of example with reference to the accompanying drawings in which.

DESCRIPTION OF THE PREFERRED EMBODIMENTS

Figure 1:
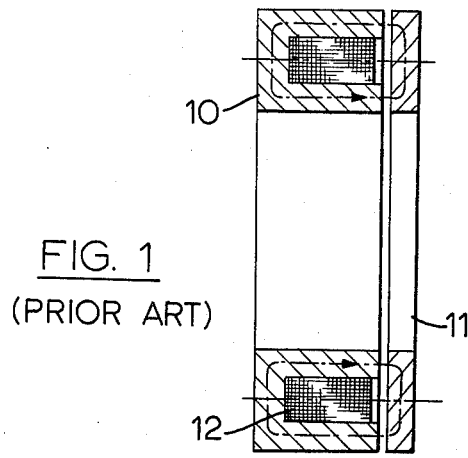
FIG. 1 shows diagrammatically a vertical section taken through the axis of a conventional electromagnetic clutch.

FIG. 1 shows a conventional electromagnetic clutch in which the electromagnet has a core 10 of annular configuration, the core having an annular end face, and an armature plate 11 having an annular face confronting the annular end face of the core. The core 10 is formed with an annular channel opening into the end face, an energizing coil 12 being located in the channel. As is usual in clutches of this type, friction surfaces are provided on the cooperating end faces of the armature and the core, these friction surfaces being pressed into engagement when the electromagnet is energized. The clutch is normally biassed into the disengaged position by compression springs (not shown) acting between the relatively movable parts.

Figure 2:
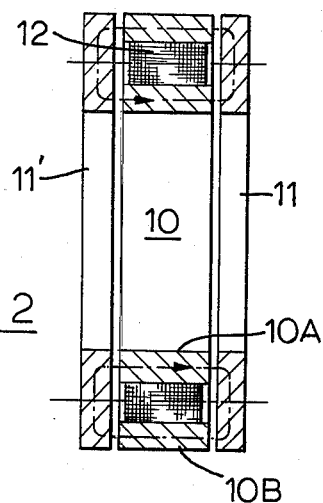
FIG. 2 is a view corresponding to FIG. 1 illustrating a form of electromagnetic clutch according to the invention.

In an electromagnetic clutch according to the invention, as illustrated diagrammatically in FIG. 2, the core 10 of the electromagnet is of annular configuration providing a pair of opposite annular end faces, and there are two armature members 11,11', each providing an annular face which confronts a respective one of the end faces of the core. The annular end faces of the core are lined with friction material. The armature members are normally biassed into the disengaged position by compression springs (not shown). The energizing winding 12 is of annular configuration and is mounted between inner and outer core parts 10A and 10B. When the electromagnet is energized, the armatures are displaced axially towards the core to engage the pairs of friction surfaces, thus engaging the clutch. In this way the number of pairs of friction surfaces have been doubled, thereby doubling the torque transmitting capacity of the clutch, without introducing the disadvantages commonly associated with clutches having a number of pairs of friction surfaces.

Figure 3:
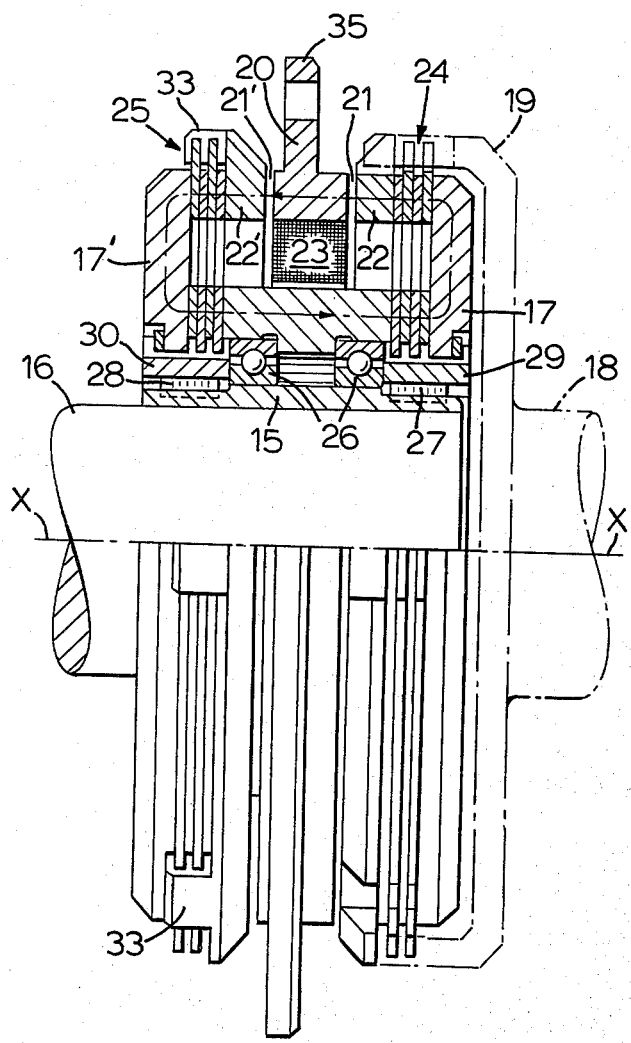
FIG. 3 is a half sectional side elevation of a multiple disk clutch according to the present invention.
Figure 4:
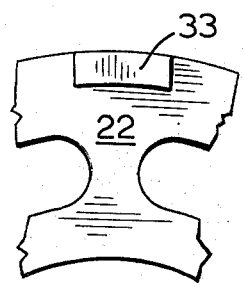
FIGS. 4, 5 and 6 illustrate details of the assembly shown in FIG. 3.
Figure 5:
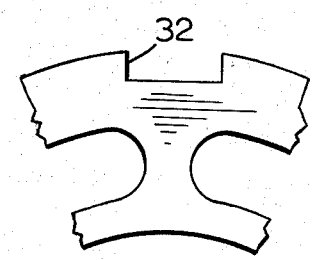
Figure 6:
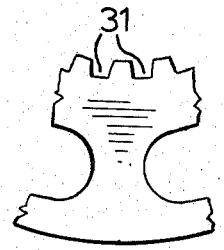

A multiple disk clutch assembly in accordance with the invention is illustrated in FIG. 3, details of the assembly being illustrated in the fragmentary views of FIGS. 4, 5 and 6. A first torque transmission means defining a rotary axis X - X is formed by a drive sleeve 15 coupled to a shaft 16, a pair of electromagnet armatures 17,17' being mounted for rotation with the drive member 15 as hereinafter described. A second torque transmission means for transmitting torque to a shaft 18 is formed by a spider 19 and includes the core 20 of an electromagnet. The electromagnet core 20 is of annular configuration providing a main core body separated by a pair of annular air gaps 21,21' from a pair of magnet portions 22,22' which define a pair of opposite annular end faces. An energizing coil of annular configuration 23 is mounted on the core. Each of the armature members 17,17' has an annular face which confronts a respective one of the end faces of the core, and is axially displaceable in relation to the core so as to effect frictional engagement between the sets of disks of a respective disk assembly 24,25.

The core of the electromagnet is journalled on bearings 26 for rotation about the clutch axis. Keyed to the drive member 15 by means of keys 27,28 are two sleeves 29,30 to which the armature members 17,17' are splined so as to rotate therewith. The sleeves 29,30 are also formed with longitudinal splines which engage key slots 31 (FIG. 6) of the inner disks of the respective disk assemblies. FIG. 6 illustrates a detail of one of the inner clutch disks. The outer disks of the disk assemblies are formed with peripheral slots 32 (FIG. 5), the spider 19 engaging the outer disks of the assembly 24 by means of the slots, and the magnet portion 22 having lugs 33 (FIG. 4) which engage in the slots of the outer disks of the disk assembly 25. Thus one rotatable assembly is constituted by the drive member 15, shaft 16, sleeves 29,30 armatures 17,17', and the inner disks of the disk assemblies 24,25. The other rotatable assembly is formed by the shaft 18, spider 19, electromagnet core 20 and the outer disks of the disk assemblies 24,25. The disks are, of course, normally biassed out of engagement by compression springs in the conventional manner. It will be noted that in the embodiment shown in FIG. 3, the electromagnet core 20 is provided with a mounting flange 35 for mounting the clutch and holding the core stationary.

When the electromagnet is energized, the armatures 17,17' are displaced axially inwards to compress the disk assemblies, thus engaging the clutch. As in the preceding embodiment, the two armature members provide, in effect, two clutch units which act in parallel, thereby doubling the torque transmitting capacity of the clutch.

Figure 8:
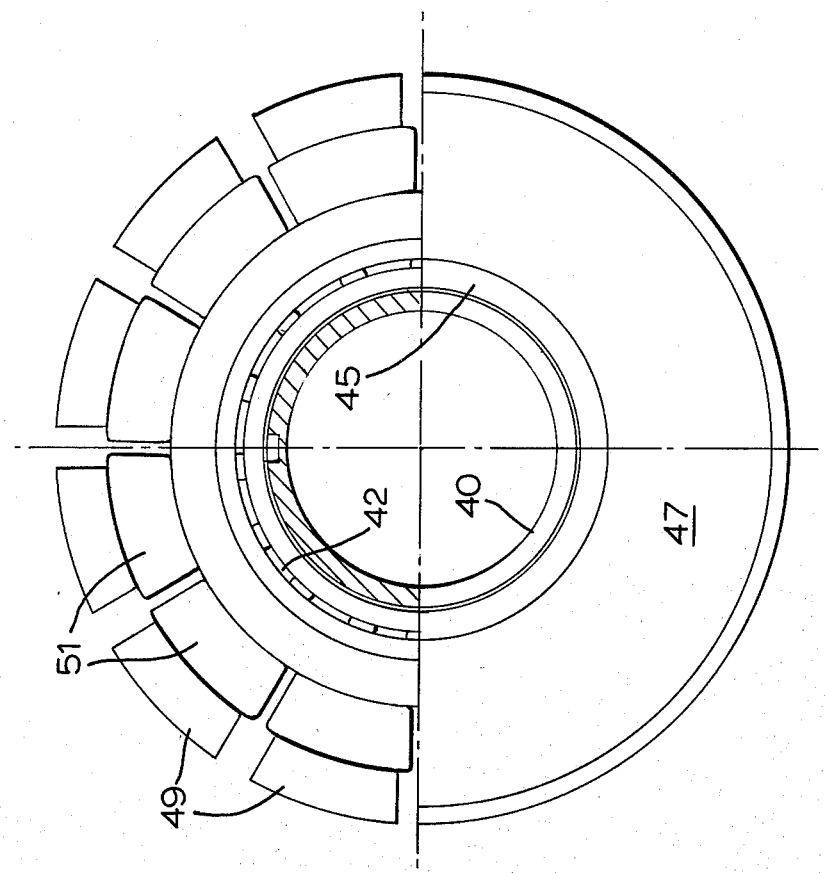
FIG. 8 is a section on line 8—8 in FIG. 7.
Figure 7:
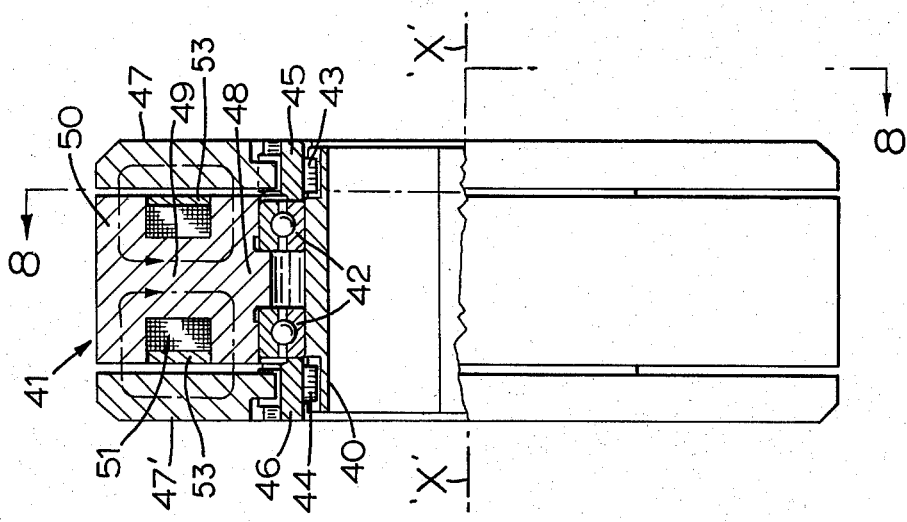
FIG. 7 is a half sectional elevation of an electromagnetic brake according to the invention.

Referring now to FIGS. 7 and 8, there is shown a brake assembly in which the first torque transmitting means is a sleeve 40 defining a rotary axis X-X. The core 41 of an electromagnet is journalled on bearings 42 permitting rotation of the sleeve 40 relative to the core. Keyed to the sleeve 40 by means of keys 43,44 are two sleeves 45,46, to which are keyed the armature members 47,47'. As in the preceding embodiments, the electromagnet core 41 is of annular configuration providing a pair of opposite annular end faces and each of the armature members 47,47' provides an annular face which confronts the end faces of the core and is spaced therefrom by an air gap. The annular faces of the core are lined with friction material 53. In this embodiment the core 41 comprises an inner body portion 48 of annular configuration, with a plurality of pole pieces 49 extending radially outwardly from the body portion. These pole pieces are symmetrically arranged with respect to the brake axis so that when the electromagnet is energized stray magnetic fields at the axis are cancelled out. Each pole piece has an axially extending portion 50 providing a pair of opposite end faces, each of which confronts a surface portion of the annular face of a respective armature member. The energizing winding in this embodiment is constituted by a plurality of interconnected coils 51 mounted on the pole pieces of the electromagnet core.

Figure 10:
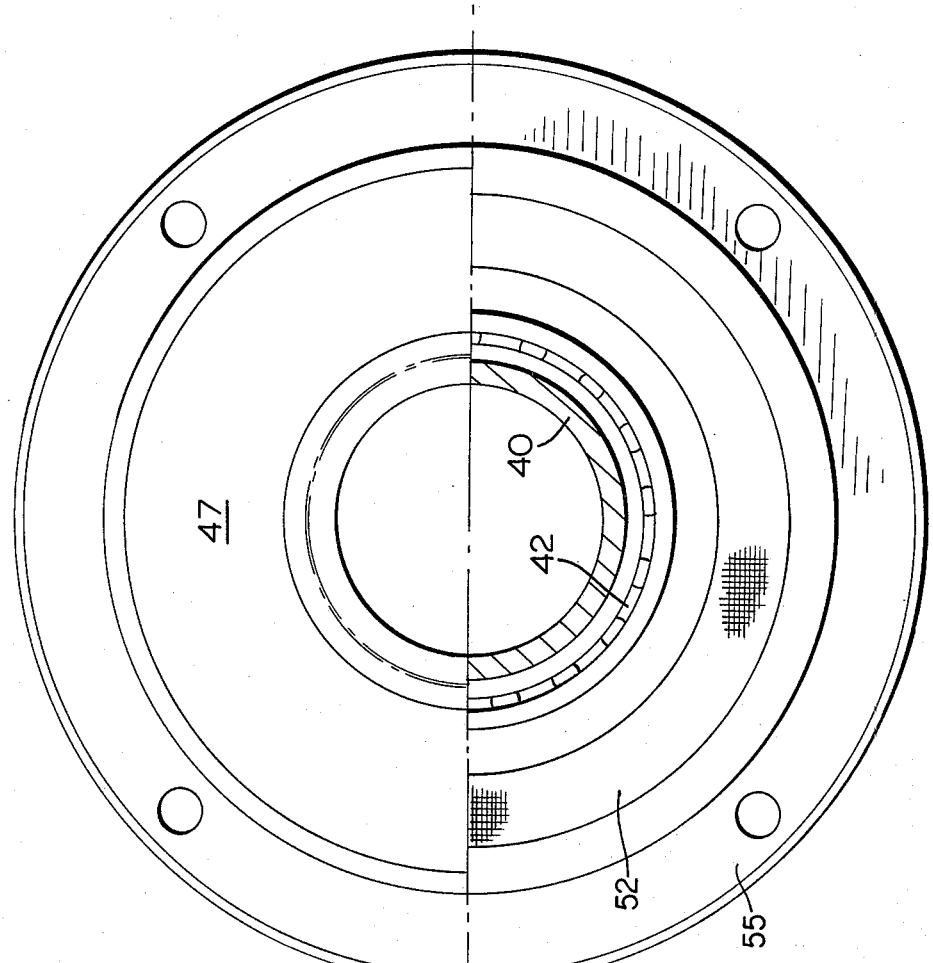
FIG. 10 is a section on line 10—10 in FIG. 9.
Figure 9:
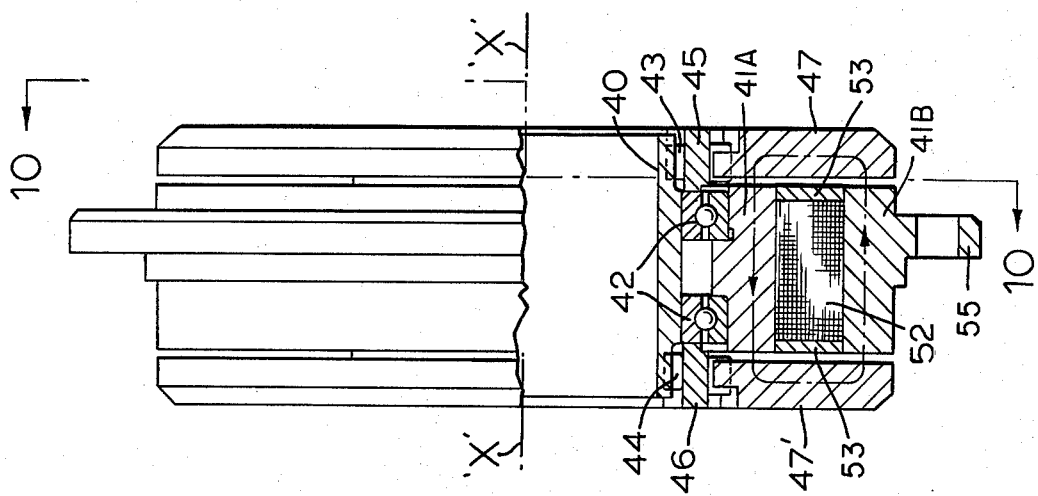
FIG. 9 is a view corresponding to FIG. 7 showing a second electromagnetic brake according to the invention.

Referring now to FIGS. 9 and 10, this embodiment is substantially as described with reference to FIGS. 7 and 8 and the same reference numerals are used to denote corresponding parts. The energizing winding, however, is not constituted by a number of coils, but is formed by a single coil 52 of annular configuration mounted on the electromagnet core, the core being formed by an inner annular core member 41A and an outer annular core member 41B, the core members being concentric and independently mounted. Thus, the outer core member 41B is provided with a mounting flange 55, and the inner core member 41A is journalled on the sleeve 40 by journal bearings 42.

An electromagnetic clutch or brake has important advantages over clutches and brakes of known design. In the first place, by virtue of the electromagnet providing two parallel magnetic circuits each associated with a respective, independent clutch assembly (or brake assembly), the torque capacity is doubled without any loss of operating efficiency. In the second place, the symmetrical, balanced design of the unit, in which the core of the electromagnet is floating, means that there is no thrust load on the support bearings.

A unit according to the invention is especially suitable for use in situations in which clutches of the multiple-disk type are presently used, despite their inherent disadvantages, on account of the low torque capacities of single-disk clutches which have been available hitherto.

What I claim as my invention is:

1. An electromagnetic clutch or brake comprising
   first torque transmission means defining a rotary axis,
   second torque transmission means journalled for rotation about said axis,
   mutually engageable means adapted when engaged to transmit torque between the first and second torque transmission means, and
   an electromagnet which is operable to effect engagement of said mutually engageable means,
   the electromagnet comprising a core of annular configuration providing a pair of opposite annular end faces, an energizing winding on said core, and a pair of armature members,
   each armature member being of annular configuration providing an annular face confronting a respective one of said end faces of the core, the armature members being axially displaceable in relation to the core to effect engagement of said mutually engageable means,
   said electromagnet core comprising a pair of inner and outer, independently mounted, annular core members, the energizing winding being constituted by a coil of annular configuration located between the core members coaxially therewith, said outer core member being provided with mounting means for direct mechanical connection to one said torque transmission means and the inner core member being journalled for rotation relative to the other said torque transmission means.

2. An electromagnetic clutch or brake according to claim 1, wherein said mutually engageable means are constituted by friction members carried by said first and second torque transmission means respectively.

3. An electromagnetic clutch or brake comprising
   first torque transmission means defining a rotary axis,
   second torque transmission means journalled for rotation about said axis,
   an electromagnet comprising a core of annular configuration providing a pair of opposite annular end faces, an energizing winding on said core, and a pair of armature members, and means providing mutually engageable friction surfaces, carried by said core and said armature members, respectively, adapted when engaged to transmit torque between the first and second torque transmission means, each armature member being of annular configuration providing an annular face confronting a respective one of said end faces of the core, the armature members being axially displaceable in relation to the core to effect engagement of said mutually engageable friction surfaces, and said electromagnet core comprising a pair of inner and outer, independently mounted, annular core members, the energizing winding being constituted by a coil of annular configuration located between the core members coaxially therewith, said outer core member being provided with mounting means for direct mechanical connection to one said torque transmission means and the inner core member being journalled for rotation relative to the other said torque transmission means.

4. An electromagnetic clutch or brake comprising
a first torque transmission assembly defining a rotary axis,
a second torque transmission assembly journalled for rotation about said axis,
said assemblies including respective mutually engageable friction plates adapted when engaged to transmit torque therebetween, and
an electromagnet having a core, an energizing winding on said core, and a pair of armature members,
said core being of annular configuration providing a pair of opposite annular end faces, each armature member being of annular configuration providing an annular face confronting a respective one of said end faces of the core, the armatures being axially displaceable in relation to the core to effect engagement of said friction plates, and
said electromagnet core comprising a pair of inner and outer, independently mounted, annular core members, the energizing winding being constituted by a coil of annular configuration located between the core members coaxially therewith, said outer core member being provided with mounting means for direct mechanical connection to one said torque transmission means and the innner core member being journalled for rotation relative to the other said torque transmission means.

5. An electromagnetic clutch or brake according to claim 4, wherein the armature members and the friction plates are symmetrically arranged with respect to a medial plane of the core extending transversely to said axis.

* * * * *